(12) United States Patent
Davis et al.

(10) Patent No.: US 11,321,649 B1
(45) Date of Patent: May 3, 2022

(54) SYSTEM AND METHOD OF A SUPPLY CHAIN RETAIL PROCESS MANAGER

(71) Applicant: JDA Software Group, Inc., Scottsdale, AZ (US)

(72) Inventors: Stephen Charles Davis, Pleasanton, CA (US); David Thomas Kudas, Teaneck, NJ (US); Donald Patrick Brenchley, Godmanchester (GB)

(73) Assignee: Blue Yonder Group, Inc., Scottsdale, AZ (US)

( * ) Notice: Subject to any disclaimer, the term of this patent is extended or adjusted under 35 U.S.C. 154(b) by 403 days.

(21) Appl. No.: 14/697,259

(22) Filed: Apr. 27, 2015

Related U.S. Application Data

(60) Provisional application No. 61/985,795, filed on Apr. 29, 2014.

(51) Int. Cl.
  *G06Q 10/00* (2012.01)
  *G06Q 10/06* (2012.01)
  *G06Q 10/08* (2012.01)
(52) U.S. Cl.
  CPC ..... *G06Q 10/06315* (2013.01); *G06Q 10/087* (2013.01)
(58) Field of Classification Search
  None
  See application file for complete search history.

(56) References Cited

U.S. PATENT DOCUMENTS

| | | | | |
|---|---|---|---|---|
| 7,925,594 B2* | 4/2011 | Jaligama | ............... | G06Q 10/067 705/348 |
| 2003/0093307 A1* | 5/2003 | Renz | .................... | G06Q 20/203 705/28 |
| 2003/0097317 A1* | 5/2003 | Burk | ...................... | G06Q 10/06 705/30 |
| 2003/0135399 A1* | 7/2003 | Ahamparam | .......... | G06Q 40/08 705/7.38 |
| 2005/0027550 A1* | 2/2005 | Pritchard | ......... | G06Q 10/06393 705/7.39 |
| 2005/0209732 A1* | 9/2005 | Audimoolam | ......... | G06Q 10/06 700/216 |
| 2007/0021967 A1* | 1/2007 | Jaligama | ............... | G06Q 10/067 705/348 |

(Continued)

OTHER PUBLICATIONS

The Evolution of Asset Management, 2007, IBM Global Business Services, p. 1-24.*

*Primary Examiner* — Joseph M Waesco
(74) *Attorney, Agent, or Firm* — Spencer Fane LLP; Steven J. Laureanti

(57) ABSTRACT

A system and method are disclosed for analyzing the maturity of one or more supply chain entities according to competencies of an omni-channel retailer. The one or more supply chain entities including a retail manager that assesses the one or more supply chain entities according to one or more competencies and determines one or more maturity gaps associated with the one or more competencies. The retail manger further identifies one or more transition projects that fill the one or more maturity gaps and roadmaps one or more transition activities that generate the one or more identified transition projects. The one or more supply chain entities further adjusts an inventory of one or more products at least partially based on the one or more roadmapped transition activities.

17 Claims, 12 Drawing Sheets

(56) References Cited

U.S. PATENT DOCUMENTS

| | | | |
|---|---|---|---|
| 2007/0143159 A1* | 6/2007 | Dillard | G06Q 10/06375 705/7.37 |
| 2007/0156584 A1* | 7/2007 | Barnes | G06Q 20/102 705/40 |
| 2008/0021930 A1* | 1/2008 | Eisaman | G06Q 10/06 |
| 2009/0138341 A1* | 5/2009 | Mohan | G06Q 10/06393 705/7.39 |
| 2009/0144125 A1* | 6/2009 | Bandyopadhyay | G06Q 10/0631 705/7.11 |
| 2012/0041851 A1* | 2/2012 | Tan | G06Q 40/12 705/28 |
| 2012/0143643 A1* | 6/2012 | Gil | G06Q 10/06313 705/7.12 |
| 2013/0277425 A1* | 10/2013 | Sharma | B65D 90/00 235/376 |
| 2014/0018949 A1* | 1/2014 | Linton | G06Q 10/06315 700/99 |
| 2014/0019471 A1* | 1/2014 | Linton | G05B 19/418 707/759 |
| 2014/0122182 A1* | 5/2014 | Cherusseri | G06Q 10/06 705/7.32 |
| 2015/0046363 A1* | 2/2015 | McNamara | G06Q 10/0833 705/333 |
| 2016/0048788 A1* | 2/2016 | Martin | H04L 41/12 705/7.25 |
| 2016/0048789 A1* | 2/2016 | Jones | G06Q 10/06315 705/7.25 |
| 2016/0048938 A1* | 2/2016 | Jones | H04L 67/42 705/7.28 |
| 2017/0337506 A1* | 11/2017 | Wise | G05B 19/418 |

* cited by examiner

Rating Report

PATHWAYS TO EXCELLENCE — 710

| Level 0 | | | Level 1 — 712 | | | Level 2 — 714 | | | | | |
|---|---|---|---|---|---|---|---|---|---|---|---|
| ID | Description | | ID | Description | | ID | Description | Rating | Maximum | Score | |
| 1 | Plan | | 1 | Strategic Plan | | 1 | Customer Strategy | 435 | 648 | 67.1% | |
| 1 | Plan | | 1 | Strategic Plan | | | SubTotal | 435 | 648 | 67.1% | |
| 1 | Plan | | | SubTotal | | | | 435 | 648 | 67.1% | |
| | Report Total | | | | | | | 435 | 648 | 67.1% | |

Page 1 of 1

FIG. 8

SYSTEM AND METHOD OF A SUPPLY CHAIN RETAIL PROCESS MANAGER

CROSS-REFERENCE TO RELATED APPLICATIONS

The present disclosure is related to that disclosed in the U.S. Provisional Application No. 61/985,795, filed Apr. 29, 2014, entitled "A System and Method of a Supply Chain Retail Process Manager." U.S. Provisional Application No. 61/985,795 is assigned to the assignee of the present application. The subject matter disclosed in U.S. Provisional Application No. 61/985,795 is hereby incorporated by reference into the present disclosure as if fully set forth herein. The present invention hereby claims priority under 35 U.S.C. § 119(e) to U.S. Provisional Application No. 61/985,795.

TECHNICAL FIELD

The disclosure relates generally to a system and method for business retail management, including managing, generating, modeling, analyzing, and evaluating business processes in a retail space, and assessing their maturity to develop an action plan of process improvements, inventory adjustments, organization design and technology enablers.

BACKGROUND

Ordinarily, retailers that self-identify as omni-channel retailers typically comprise two-channels, at most. In these retailers, even those having a website with e-commerce, the various retail sections are siloed between their e-commerce and brick-and-mortar retail channels.

For example, a retailer may have a customer in a brick-and-mortar retailer wanting to use an online service to find what products that brick-and-mortar retailer currently stocks and information about those products. The retailer would need to create an online retail presence that would allow the customer to purchase a product online and pick it up in the nearest brick-and-mortar location. Most retailers fail to integrate all the various levels of retail into one seamless shopping experience, which ordinarily requires reorganization of the structure of the supply chain entity. This lack of integration is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 8 illustrates an exemplary ratings report interface in accordance with an embodiment;

DETAILED DESCRIPTION

Figure 1:
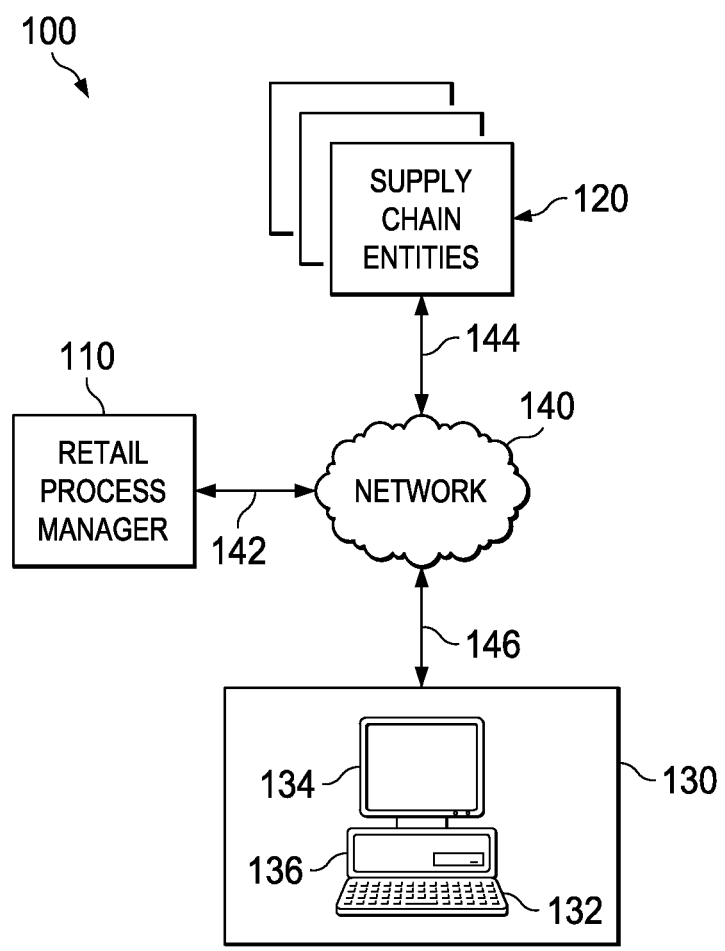
FIG. 1 illustrates an exemplary supply chain network according to a first embodiment.

High-level process markers and applications of the invention presented herein are described below in the drawings and detailed description of the invention. Unless specifically noted, it is intended that the words and phrases herein be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an exemplary system 100 according to a preferred embodiment. System 100 comprises retail process manager 110, one or more supply chain supply chain entities 120, computers 130, network 140, and communication links 142, 144, and 146. Although a single retail process manager 110, one or more supply chain supply chain entities 120, a single computer 130, and a single network 140, are shown and described; embodiments contemplate any number of retail process managers 110, any number of supply chain supply chain entities 120, any number of computers 130, or any number of networks 140, according to particular needs.

System 100 may operate on one or more computers 130 that are integral to or separate from the hardware and/or software that support retail process manager 110 and one or more supply chain supply chain entities 120. Computers 130 may include any suitable input device 132, such as a keypad, mouse, touch screen, microphone, or other device to input information. An output device 134 may convey information associated with the operation of system 100, including digital or analog data, visual information, or audio information. Computers 130 may include fixed or removable computer-readable storage media, including a non-transitory computer-readable storage medium, magnetic computer disks, flash drives, CD-ROM, in-memory device or other suitable media to receive output from and provide input to system 100. Computers 130 may include one or more processors 136 and associated memory to execute instructions and manipulate information according to the operation of system 100.

Although a single computer 130 is shown in FIG. 1, retail process manager 110 and one or more supply chain supply chain entities 120 may each operate on separate computers 130 or may operate on one or more shared computers 130. Each of the one or more computers 130 may be a work station, personal computer (PC), network computer, notebook computer, tablet, personal digital assistant (PDA), cell phone, telephone, wireless data port, or any other suitable computing device. In an embodiment, one or more users may be associated with retail process manager 110. These one or more users may include, for example, a "manager" or a "planner" handling retail process management and/or one or more related tasks within system 100. In addition, or as an alternative, these one or more users within system 100 may include, for example, one or more computers 130 programmed to autonomously handle, among other things, evaluation of various levels of retail process management, estimating, computing and adjusting of various levels of product inventory and/or one or more related tasks within system 100.

In one embodiment, one or more supply chain supply chain entities 120 represent one or more supply chain networks including one or more entities, such as, for example suppliers, manufacturers, distribution centers, retailers, stores, online stores, and/or customers. A supplier may be any suitable entity that offers to sell or otherwise provides one or more items (i.e., materials, components, or products) to one or more manufacturers. Items may comprise, for example, products, parts, or supplies that may be used to generate products. An item may comprise a part of the product, or an item may comprise a supply that is used to manufacture the product, but does not become a part of the product, for example, a tool, energy, or resource. A manufacturer may be any suitable entity that manufactures at least one finished good. A manufacturer may use one or more items during the manufacturing process to produce a finished good. In this document, the phrase "finished good" may refer to any manufactured, fabricated, assembled, or otherwise processed item, material, component, good or product. A finished good may represent an item ready to be supplied to, for example, another supply chain entity 120 in the system, such as a supplier, an item that needs further processing, or any other item. A manufacturer may, for example, produce and sell a finished good to a supplier, another manufacturer, a distribution center, a retailer, a customer, or any other suitable person or entity. A distribution center may be any suitable entity that offers to sell or otherwise distributes at least one finished good to one or more retailers and/or customers. A retailer may be any suitable entity that obtains one or more finished goods to sell to one or more customers.

Although one or more supply chain supply chain entities 120 are shown and described as separate and distinct entities, the same entity may simultaneously act as any one of the one or more supply chain supply chain entities 120. For example, one or more supply chain supply chain entities 120 acting as a manufacturer could produce a finished good, and the same entity could act as a supplier to supply an item to another supply chain. Although one example of a supply chain network is shown and described, embodiments contemplate any operational environment and/or supply chain network, without departing from the scope of the present invention.

In one embodiment, retail process manager 110 is coupled with network 140 using communications link 142, which may be any wireline, wireless, or other link suitable to support data communications between retail process manager 110 and network 140 during operation of system 100. One or more supply chain entities 120 are coupled with network 140 using communications link 144, which may be any wireline, wireless, or other link suitable to support data communications between one or more supply chain entities 120 and network 140 during operation of system 100. Computers 130 are coupled with network 140 using communications link 146, which may be any wireline, wireless, or other link suitable to support data communications between computers 130 and network 140 during operation of system 100.

Although communication links 142, 144, and 146 are shown as generally coupling retail process manager 110, one or more supply chain entities 120, and computers 130 with network 140, retail process manager 110, one or more supply chain entities 120, and computers 130 may communicate directly with retail process manager 110, one or more supply chain entities 120, and/or computers 130, according to particular needs.

In another embodiment, network 140 includes the Internet and any appropriate local area networks (LANs), metropolitan area networks (MANs), or wide area networks (WANs) coupling retail process manager 110, one or more supply chain entities 120, and computers 130. For example, data may be maintained by retail process manager 110 at one or more locations external to retail process manager 110 and one or more supply chain entities 120 and made available to one or more associated users of one or more supply chain entities 120 using network 140 or in any other appropriate manner. Those skilled in the art will recognize that the complete structure and operation of communication network 140 and other components within system 100 are not depicted or described. Embodiments may be employed in conjunction with known communications networks 140 and other components.

In accordance with the principles of embodiments described herein, retail process manager 110 generates a roadmap of one or more supply chain entities 120 to transform to an omni-channel retailer by analyzing and rating process markers and generating one or more transformation projects. According to some embodiments, process level markers correlate to program and business processes that are required for omni-channel competency. Each process level marker is analyzed by a competency scale, and based on the particular competencies determined for each process level marker, a transformation plan is generated and executed for various processes to transform the retailer to an omni-channel retailer. The transformation plan comprises project and process opportunities that correlate to specific maturity gaps, which when implemented transform one or more retail processes to an omni-channel retail process. In addition, or as an alternative, the project and process opportunities may be rated by one or more metrics, such as, for example, return on investment, value, project complexity, resource need, and/or organizational impact.

As explained above, a prototypical omni-channel retailer ideally provides a seamless shopping experience between all channels of retail performed by supply chain entities 120. As an example only and not by way of limitation, competencies of an exemplary omni-channel retailer include: brand excellence, consumer centricity, supply chain focus, accelerated technology, and organization alignment. Each of these exemplary competencies, will be discussed in relation to retail process manager 110 in more detail below.

In some embodiments, retail process manager 110 indicates a degree to which one or more high-level process markers of a supply chain entities 120 conforms to an omni-channel retailer and may adjust the inventory of one or more supply chain entities 120, based on the degree of conformity to an omni-channel retailer. However, indicating the degree of conformity to an omni-channel retailer is simply one non-limiting example.

Figure 2:
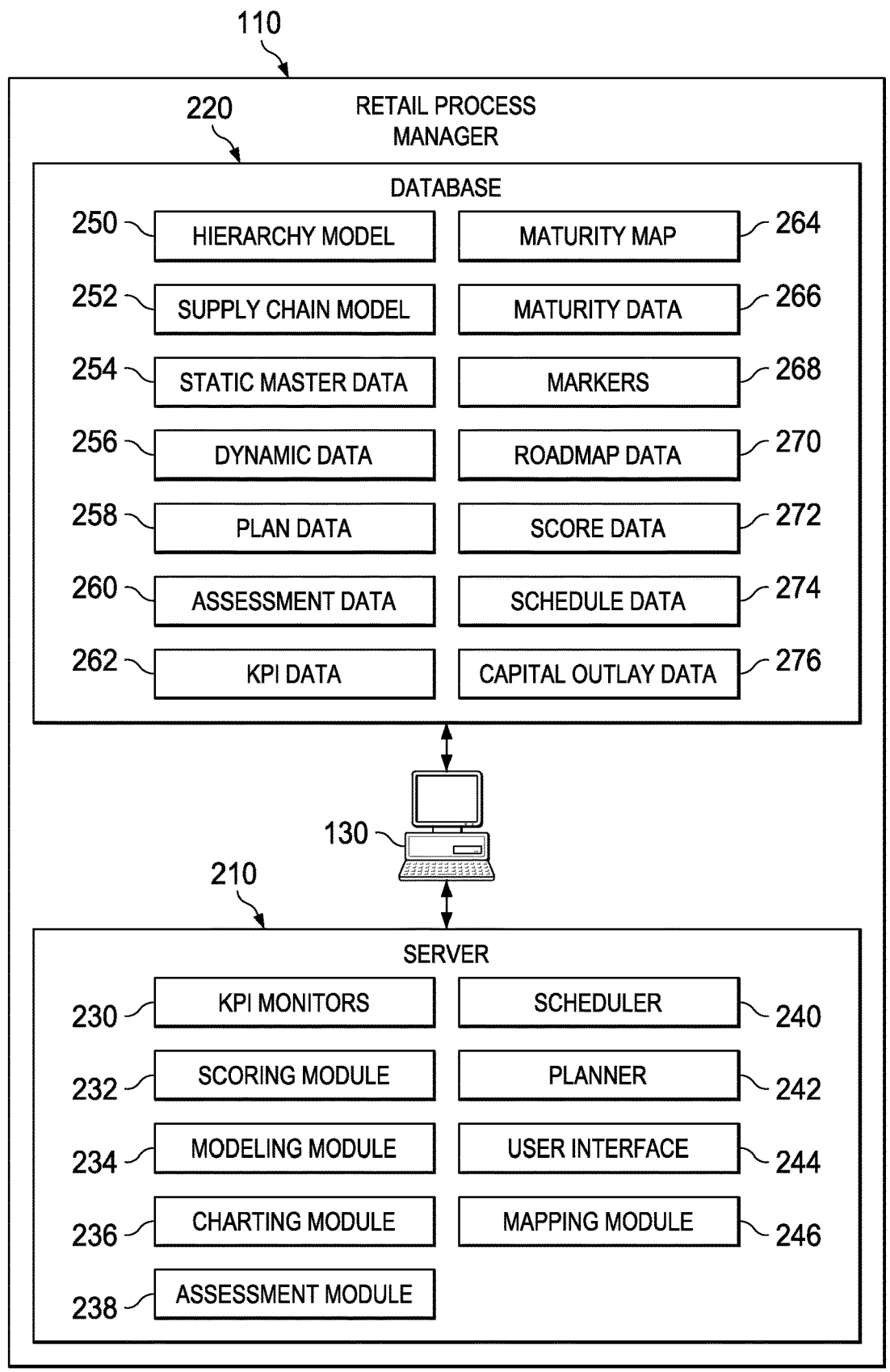
FIG. 2 illustrates the retail process manager of FIG. 1 in greater detail in accordance with the first embodiment.

FIG. 2 illustrates retail process manager 110 of FIG. 1 in greater detail in accordance with an embodiment. As discussed above, retail process manager 110 comprises one or more computers 130 at one or more locations including associated input devices, output devices, non-transitory computer-readable storage media, processors, memory, or other components for receiving, processing, storing, and communicating information according to the operation of supply chain network 100. According to some embodiments, retail process manager 110 comprises computer 130, server 210, and database 220. Although the depiction in FIG. 2 includes computer 130 internal to retail process manager 110, computer 130 may be externally coupled with retail process manager 110 by any wireless or wireline connection.

Server 210 of retail process manager 110 comprises key performance indicator (KPI) monitors 230, scoring module 232, modeling module 234, charting module 236, assessment module 238, scheduler 240, planner 242, user interface 244, and mapping module 246, which are described in more detail below. Although server 210 is shown and described as comprising a single KPI monitors 230, scoring module 232, modeling module 234, charting module 236, assessment module 238, scheduler 240, planner 242, user interface 244, and mapping module 246, embodiments contemplate any suitable number or combination of these, according to particular needs. In addition, or as an alternative, KPI monitors 230, scoring module 232, modeling module 234, charting module 236, assessment module 238, scheduler 240, planner 242, user interface 244, and mapping module 246 may be located at one or more locations, local to, or remote from, retail process manager 110 such as, for example, on multiple servers 210 or computers 130 at any location in system 100.

Database 220 comprises one or more databases or other data storage arrangements at one or more locations, local to, or remote from, server 210. Database 220 includes, for example, hierarchy model 250, supply chain model 252, static master data 254, dynamic data 256, plan data 258, assessment data 260, KPI data 262, maturity map 264, maturity data 266, process markers 268, roadmap data 270, score data 272, schedule data 274, and capital outlay data 276, described in more detail below. Although, the database is shown and described as comprising a single hierarchy model 250, supply chain model 252, static master data 254, dynamic data 256, plan data 258, assessment data 260, KPI data 262, maturity map 264, maturity data 266, process markers 268, roadmap data 270, score data 272, schedule data 274, and capital outlay data 276, embodiments contemplate any suitable number or combination of these, located at one or more locations, local to, or remote from, retail process manager 110, according to particular needs.

Figure 3:
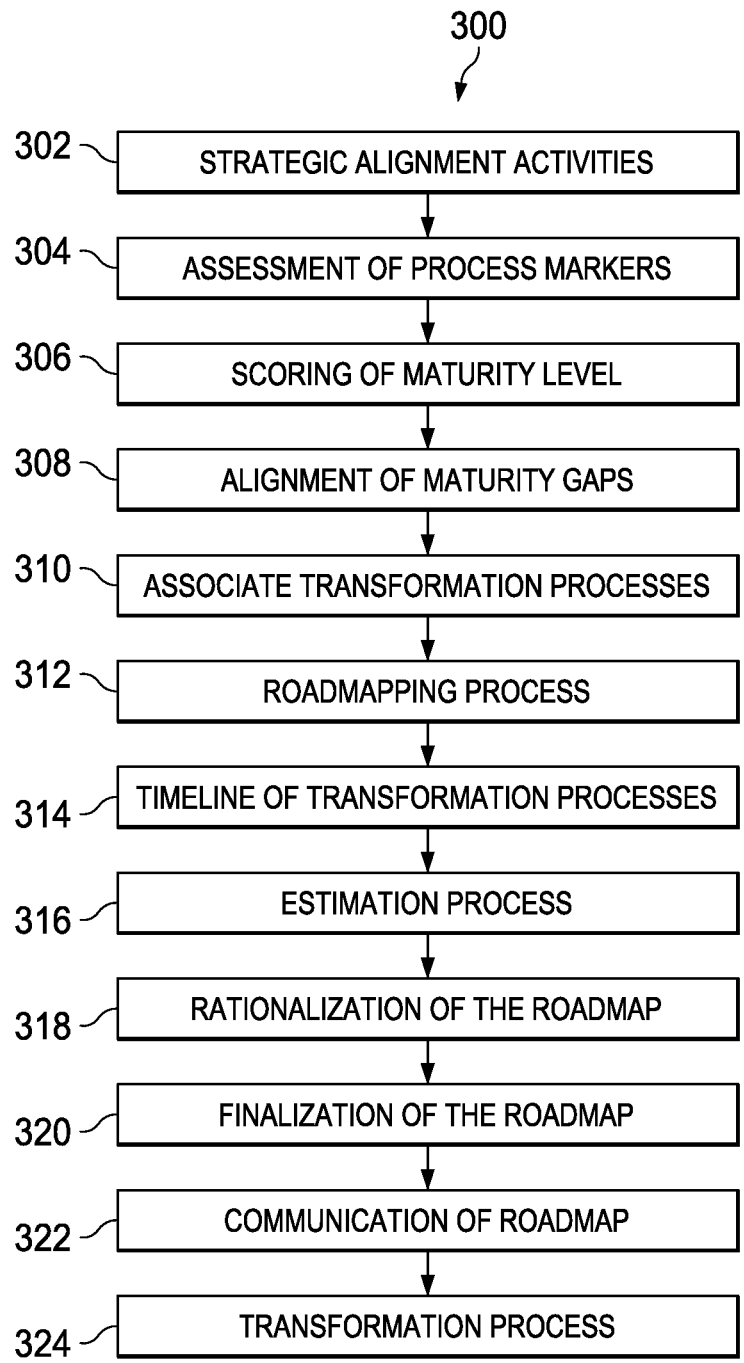
FIG. 3 illustrates an exemplary method of enterprise transformation according to a maturity level.

FIG. 3 illustrates a process 300 of transforming supply chain entities 120 into an omni-channel retailer via retail process manager 110. The process 300 of transforming supply chain entities 120 proceeds by one or more activities, which although described in a particular order may be performed in one or more permutations according to particular needs. Each of the activities will be described in brief, followed by a more thorough discussion below.

At activity 302, retail process manager 110 identifies one or more key performance measures of supply chain entities 120 to be processed by retail process manager 110. For example, the strategic alignment activity 302 may identify one or more endpoint maturity levels of KPIs, competencies, characteristics, processes, and/or process markers of supply chain entities 120 to be matured by the roadmap generated by retail process manager 110.

At activity 304, retail process manager 110 assesses supply chain entities 120 to identify an initial maturity level for each of the one or more KPIs, competencies, characteristics, processes, and/or process markers. According to some embodiments, retail process manager 110 assesses each of the one or more process markers according to one or more competencies and/or KPI by generating, for example, a score or an initial maturity level.

At activity 306, the score generated by scoring module 232 is accessed by mapping module 246. Mapping module 246 accesses an initial maturity level or score generated by scoring module 232. Mapping module 246 receives a desired final maturity level, and the initial maturity level and final maturity level are compared. A gap is defined between the current, initial maturity level and the final, desired maturity level, for each supply chain entity 120.

At activity 308, maturity map and/or the assessment are provided to supply chain entities 120 in the form of, for example, a survey report, to determine alignment of the initial maturity levels and final maturity levels with the strategic goals of supply chain entities 120. According to some embodiments, activity 308 comprises aligning the maturity gaps with one or more identified transformation processes. In addition, or as an alternative, each of the one or more transformation processes indicate a process to transform supply chain entities 120 from an initial maturity level to a final maturity level after initializing and finishing the transformation process.

At activity 310, retail process manager 110 uses the alignment generated at activity 308 and associates each of the one or more transformation processes with one or more maturity gaps identified in the level-two process markers. At activity 312, retail process manager 110 begins a roadmapping process by categorizing and sorting the transformation process according to one or more metrics. According to some embodiments, the roadmapping process generates a project bubble chart comprising transformation processes categorized according to one or more of project value, project complexity, amount of required resources, and organizational impact change.

At activity 314, retail process manager 110 generates a roadmap by selecting and prioritizing one or more transformation processes. According to some embodiments, the roadmap comprises a timeline of transformation processes according to an order in which the transformation processes are ideally implemented by supply chain entities 120 to transform into an omni-channel retailer. At activity 316, retail process manager 110 estimates a cost and return on investment for each of the transformation processes in the roadmap and estimates future capital received by supply chain entities 120.

At activity 318, retail process manager 110 rationalizes the roadmap according to the estimates cost and return on investment for each of the transformation processes in the roadmap in accordance with the estimates of future capital received by supply chain entities 120. At activity 320, retail process manager 110 finalizes the roadmap according to the rationalization process by moving, deleting, or adding transformation processes so that the return on investment and cost of each transformation process is permitted by the estimated future capital receives by supply chain entities 120.

At activity 322, a final roadmap is generated by retail process manager 110 and communicated to supply chain entities 120. At activity 324, supply chain entities 120 perform the transformation processes according to the final roadmap and transforms into an omni-channel retailer and the process ends. Each of the activities outline above in connection with FIG. 3 will now be discussed in further detail, according to one or more embodiments.

Figure 5:
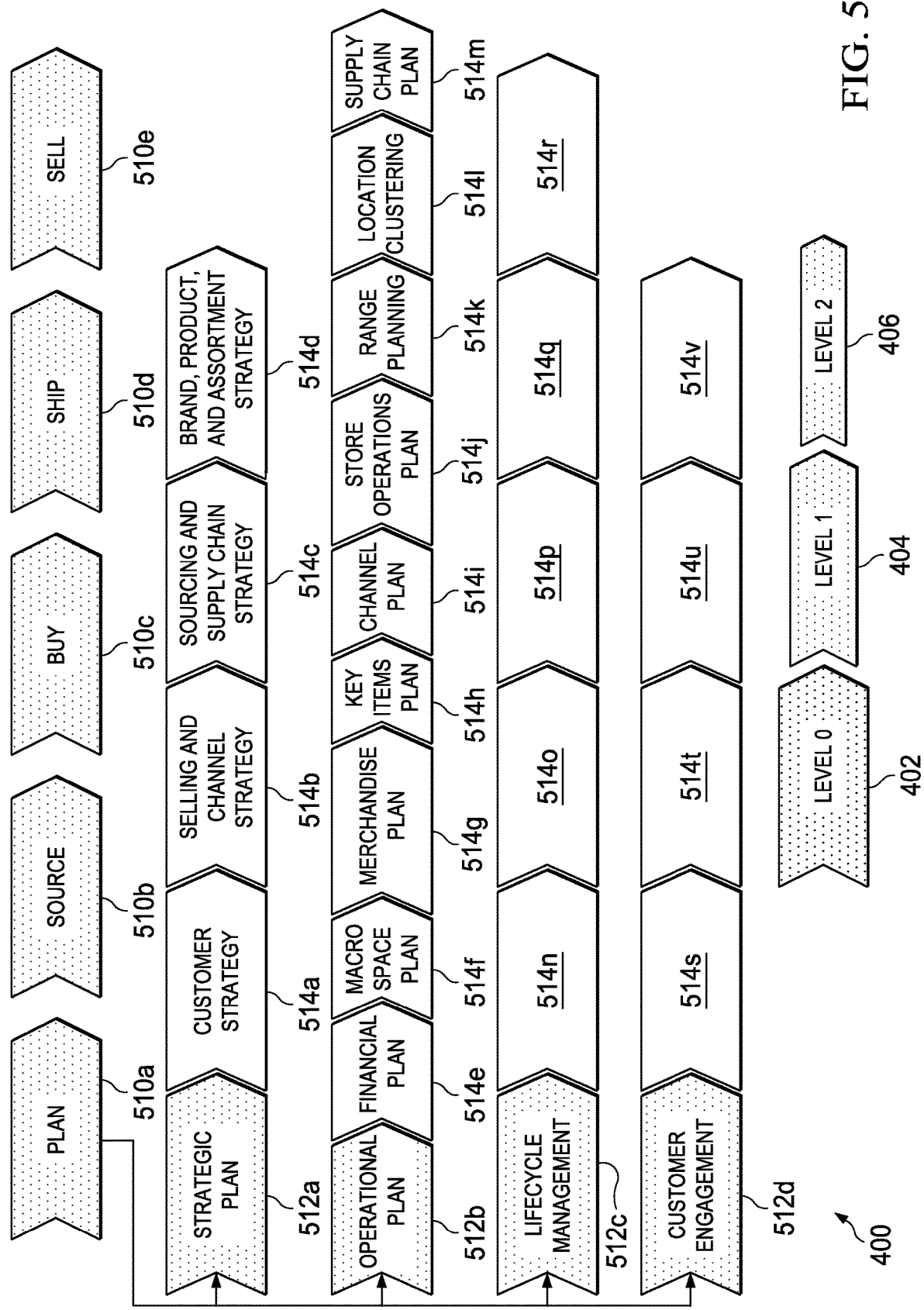
FIG. 5 illustrates an exemplary disaggregation of a retail process marker hierarchy in accordance with an embodiment.

Returning to activity 302, retail process manager 110 receives one or more key performance indicators of supply chain entities 120 to be processed by retail process manager 110. For example, supply chain entities 120 may choose one or more key performance indicators that are indicative of an omni-channel retailer and communicate those key performance indicators to retail process manager 110 for processing, according to the method 300. According to some embodiments, an omni-channel retailer comprises key performance indicators according to at least five KPI areas, hereinafter referred to as competencies: brand excellence, customer centricity, supply chain focus, accelerated technology, and organization alignment. According to some embodiments, competencies include internal and external collaboration and one or more additional competencies. As an example only and not by way of limitation, key performance indicator competencies of supply chain entities 120 may include reduced out of stocks in stores or fulfillment centers, reduction of effort to complete key tasks (common in a retailer having people working channel-by-channel rather than across channels), increased visibility of products across supply chain entities 120 and the like. In addition, or as an alternative, examples of functional competencies are shown and described in further detail in FIG. 5 and comprise level-one process markers: strategic plan 512a, operational planning 512b, lifecycle management 512c, and customer engagement 512d. Brand excellence of an omni-channel retailer may be characterized by the following characteristics: a transition from "consumers interacting with the channel" to "consumers interacting with the brand;" the "new loyalty" is to the brand experience, no longer to the retailer; universal "palate" of brand values rigorously applied; services available on-line replicated in store and vice versa; the extended-aisle concept to increase range breadth and depth; non-selling services provided also reflect Brand Values (E.g. "in Store Packaging" for home delivery); "channel competition" must end—all channels exist for the consumer, with no channel more important than the other; elimination of channel in the organizational hierarchy; and people/activities in one channel are pro-actively advocating for the other(s).

Consumer centricity of an omni-channel retailer may be characterized by the following characteristics: customer "credentials" are common irrespective of channel shopped; loyalty is rewarded; special offers bespoke to that customer; recognition of a customer's different buying behaviours based on product and mode; a single, preferred default method of payment but simple to change; and diverse delivery mechanisms with point of purchase selection (e.g. click and collect, buy in store, but deliver to home).

Supply chain focus of an omni-channel retailer may be characterized by the following characteristics: the consumer is the end of the supply chain; the store is an integral element of the supply chain, not the end; direct orders are intuitively fulfilled from the inventory location most able to profitably draw down the inventory while maintaining service; supply chain segmentation provides flexible fulfillment options, and enables retailers to profitably promise goods to the consumer; built-in flexibility to adapt and alter distribution at critical points in the chain in real time; inventory is managed collaboratively with suppliers to improve fulfilment; supply chains have full visibility to retailer & supplier; and distribution, fulfilment and transportation assets are proactively managed in anticipation of the channel and delivery method.

Accelerated technology of an omni-channel retailer may be characterized by the following characteristics: big Data synthesized to usable predictive analytics—customer by channel by product by date; real-time awareness of customer touch-points, with ability to react to every interaction with all-channel history; use of RFID, QR, near field communication (NFC), facial recognition, and other technologies—working together—to track behaviour; social media used as a tracking method as well as a marketing tool; advanced business intelligence to understand consumers' absolute need and their "parameters of flexibility" (trade-offs she is prepared to make) on each occasion that she makes a purchase; and customer demand forecasting to predict consumer need, and proactively recommend best channel to fulfil.

Organization alignment of an omni-channel retailer may be characterized by the following characteristics: if there are multiple buying, sourcing, logistics and procurement teams across channels they will be consolidated into one; store staff become part of the supply network; employees are cross-functionally-oriented and aligned with the supply chain; compensation is based on cross-function and cross-channel overall performance; rewards based on any sale from any channel; central office is aligned for brand management, with channel execution (marketing, advertising, presentation) integrated in with buying; and traditional location planners become "customer segment planners" with channel plans based on forecasted consumer/timing preferences.

In one embodiment, each competency may be understood as comprising at least four maturity levels: innocence, understanding, competence, and excellence, ranked from least correlation of supply chain entities 120 to an omni-channel retailer to the highest correlation. In an embodiment, this may be termed a maturity scale. According to some embodiments, each of the maturity levels innocence, understanding, competence, and excellence correlate to a numerical score, for example, 1, 2, 3, and 4, respectively. Although the maturity levels are shown and described as comprising innocence, understanding, competence, and excellence and the maturity scale is described as comprising a numerical score of 1-4, embodiments contemplate any type or number of maturity levels and any type of scale associated with the numerical scale, according to particular needs.

In one embodiments, the maturity scale can be understood according to the qualifications of each of the maturity levels for each of the competencies according to the following TABLES 1-5.

TABLE 1

| KPI Area | Innocence | Understanding | Competence | Excellence |
|---|---|---|---|---|
| Brand Excellence | Channels are silo'd and function independently<br>Localized brand experience by channel<br>Price specific to channel<br>Independent offers by channel<br>Assortment dedicated to each channel<br>Brand values are specific to the channel<br>Financial reporting by channel is independent | Key brand features are common across channels<br>Some elements of the assortment are common in each channel "core/extra"<br>Channel specific campaigns and advertising<br>Customer is recognized in each channel but no synergy<br>Product lifecycles are non-aligned by channel | Brand values are common across all channels<br>Pricing and promotions are common across all channels<br>Activities encourage interaction between channels<br>Assortment is represented across all channels<br>Markdowns still used to reduce inventory at the expense of brand integrity | A virtue is made of multi-channel presence<br>Recognition that the customer interacts with the brand not the channel<br>Single, centralized view of the customer and her behaviors<br>"Do anything anywhere" is a part of the brand experience<br>Pricing and promotions are targeted at the shopper to enhance the brand<br>Brand experience extends beyond point of purchase |

TABLE 2

| KPI Area | Innocence | Understanding | Competence | Excellence |
|---|---|---|---|---|
| Customer Centricity | One-off transactional relationship with customer<br>Customer registered with Individual channel<br>No passing of customer data between channels<br>Entirely localized picture of the customer | Customer is registered or recognized across channels<br>Purchase history is understood across all channels<br>Customer behavior is regard as common across all channels<br>Some effort to encourage cross channel purchases | Customer is recognized in all channels<br>Purchase behavior is understood within the channel<br>Activities in one channel drive interaction with alternative channels<br>Loyalty is rewarded, usually with coupons, etc. | Single view of the customer<br>Buying behavior by mode and channel is understood and differentiated<br>Data drawn from all channels influences customer specific offers<br>Loyalty/reward is specific to customer<br>"Behavior forecasting" to connect and serve customers where they are physically but also where they might be virtually |

TABLE 3

| KPI Area | Innocence | Understanding | Competence | Excellence |
|---|---|---|---|---|
| Supply Chain Focus | Product for each channel is ordered and serviced as separate entity<br>Network is specific to a channel<br>Inventory is dedicated to a channel<br>Stores regarded as the end of the | Differentiated networks for meeting alternative channel requirements<br>Trade-offs between distribution models understood<br>Brand service | Single stock pool model allows for demand to be met from any stock location<br>Suppliers integrated to distribution and returns pool<br>Returned stock immediately available to | Supply chain a differentiator<br>Provides near instantaneous fulfillment; reliable and responsive to different requirements<br>Store is part of the supply chain, not end of the supply |

TABLE 3-continued

| KPI Area | Innocence | Understanding | Competence | Excellence |
|---|---|---|---|---|
| | supply chain Availability measured by the day Suppliers not integrated to the supply chain Rudimentary returns mechanism with slow return to stock Distribution performance not regarded as pari of the brand values | values reflected in some aspects of supply chain performance Cross-channel returns mechanisms in place and with inter store and channel transfers facilitated by exception | promise Customer dedicated services at point of delivery | chain Delivery service reflects the brand values (eg, liveried cans, smart drivers, in home services) |

TABLE 4

| KPI Area | Innocence | Understanding | Competence | Excellence |
|---|---|---|---|---|
| Accelerated Technology | Channel specific platforms Transactional systems with minimal customer data collections No analysis of customer spending/buying habits Website presentation compromised by non mobile capabilities such as flash Channels supported by independent platforms | Collection of customer transaction data by channel Some analysis to support business execution but little customer insight Some attempt to integrate/coalesce channel specific information | A single point of client data and access across all channels Multiple payment choices supported with cross channel loyalty Organize, automates and synchronize business processes Interprets the specific needs of an individual by combining information from difference purchase channels | Real-time engagement with consumers via their mobile technology Insight into what customers are doing online in your store Customer specific offers and services based on consumer insight and personal profitability All current and future mobile technologies supported Instantaneous response and real time information available to any channel |

TABLE 5

| KPI Area | Innocence | Understanding | Competence | Excellence |
|---|---|---|---|---|
| Organization Alignment | Independent organizations by channel Performance goals are separated by channel with no overall objectives Advertising and marketing are separated and centralized May have a "Chief Direct Officer" to manage direct business independently of store business Merchants are separated along | All-channel buying and planning - silo elimination within merchandising | Performance objectives represent cross-channel success Stores resources are aligned as "Customer Facing" and "Service Providers" Elimination of separate "eCom" buying/marketing group - integration in to all-channel merchandising | Compensation for members of all channels aligned to total success Organization of buying silos into category-centric "hives" all engaged to support offers of product to customer Marketing, pricing, promotion groups combines and split into category management teams |

TABLE 5-continued

| KPI Area | Innocence | Understanding | Competence | Excellence |
|---|---|---|---|---|
| | product lines Store operations separate from merchandising and marketing | | | |

According to some embodiments, after the key performance measures are received by retail process manager 110, retail process manager 110 assesses one or more process markers according to the maturity levels of the competencies.

Figure 4:
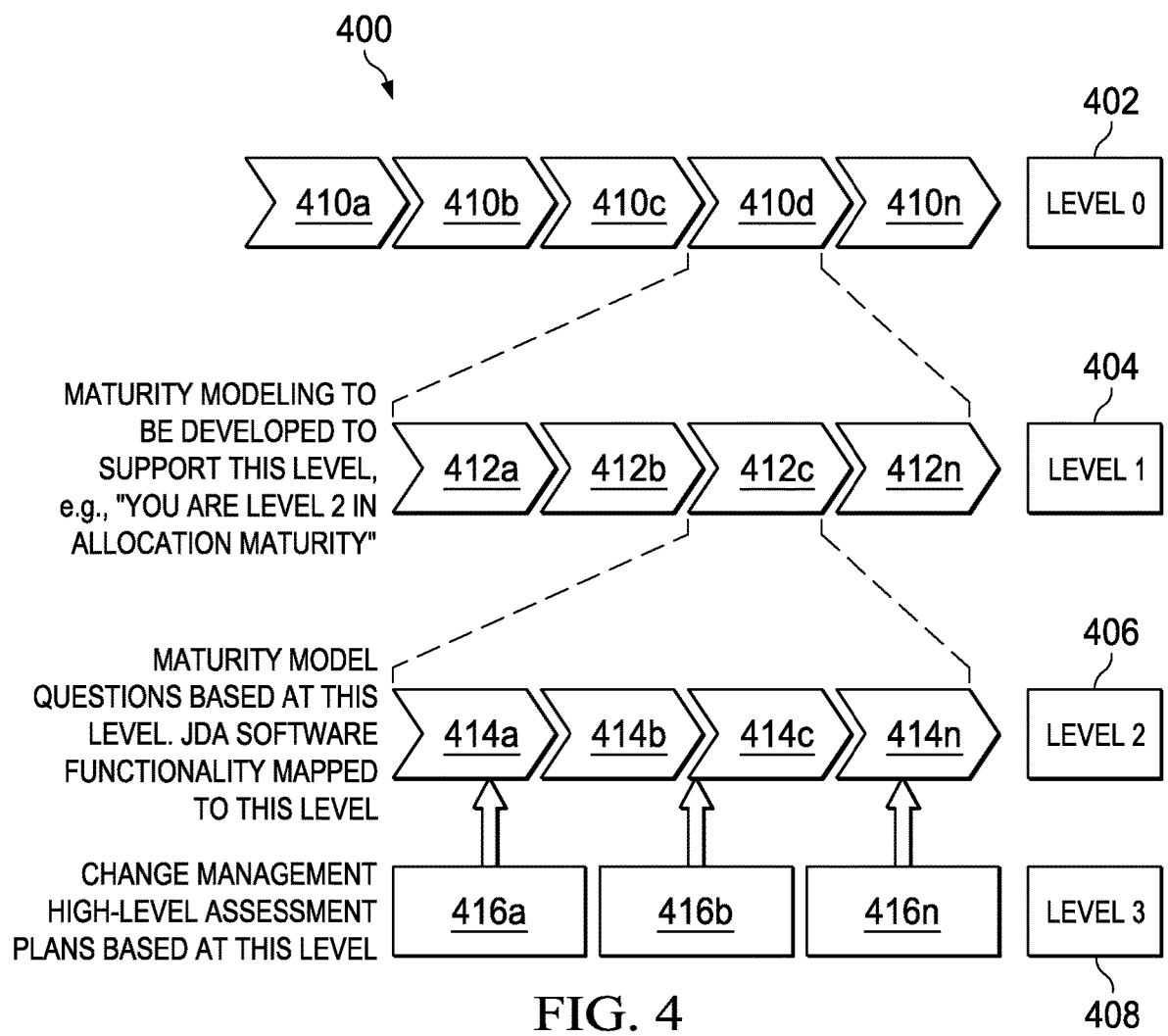
FIG. 4 illustrates an exemplary retail process marker hierarchy in accordance with an embodiment.

FIG. 4 illustrates a retail process methodology hierarchy 400 as implemented by retail process manager 110. As illustrated, retail process methodology hierarchy 400 comprises four analysis levels 402-408 that determine the maturity level of each of five high-level process markers 410a-410n of supply chain entities 120. Although retail process methodology hierarchy 400 is depicted including four analysis levels 402-408, embodiments contemplate any number of analysis levels 402-408, according to particular needs.

As an example only and not by way of limitation, the hierarchy of process markers 400 comprises four analysis levels: level-zero 402, level-one 404, level-two 406, and level-three 408. According to some embodiments, level-zero 402 comprises one or more high-level process markers 410a-410n. Each high-level process markers 410a-410n may be associated with one or more high-level business organizational characteristics. Although, five high-level process markers 410a-410n are shown and described, embodiments contemplate any number of high-level process markers 410a-410n, according to particular needs. Each of the high-level process markers 410a-410n may comprise one or more level-one process markers 412a-412n at level-one 404. Each of the level-one process markers 412a-412n may be associated with one or more maturity mapping levels or a level-one business characteristic. Although four level-one process markers 412a-412n are shown and described, embodiments contemplate any number of level-one process markers 412a-412n, according to particular needs.

In addition, or as an alternative, each of the level-one process markers 412a-412n may comprise one or more level-two process markers 414a-414n at level-two 406. Each of the level-two process markers 414a-414n may be associated with one or more maturity mapping inquiries, software functionalities or modules, or a level-two business characteristic. Although four level-two process markers 414a-414n are shown and described, embodiments contemplate any number of level-two process markers 414a-414n, according to particular needs.

In addition, each of the level-two process markers 414a-414n may comprise one or more level-three process markers 416a-416n at level-three 408. Each of the level-three process markers 416a-416n may be associated with one or more change management high-level assessment plans or a level-three business characteristic. Although three level-three process markers 416a-416n are shown and described, embodiments contemplate any number of level-three process markers 416a-416n, according to particular needs.

By way of example only and not by way of limitation, an example is now given. In the following example and referring to FIG. 5, retail process methodology hierarchy 400 comprises five level-zero 402 high-level process markers: plan 410a, source 510b, buy 510c, ship 510d, and sell 510e.

According to the illustrated embodiment, plan 510a, in turn, comprises four level-one process markers: strategic plan 512a, operational planning 512b, lifecycle management 512c, and customer engagement 512d. Although not illustrated in FIG. 5, source 510b may comprise one or more of the following level-one process markers: concepts and product design, product specification, manage materials, source products, manage and samples quantity, and procurement.

Buy 510c may comprise one or more of the following level-one process markers: assortment review, negotiate, and ordering. Ship 510d may comprise one or more of the following level-one process markers: allocation, fulfillment/replenishment, warehouse/DC operations, and optimization. Sell 510e may comprise one or more of the following level-one process markers: customer relationships, store presentation, pricing and localization, and store operations. Additional high-level markers and various other business objectives and markers may be implemented into hierarchy 300 according to particular needs.

At the next level of hierarchy 400, strategic plan 512a of plan 510a comprises four level-two process markers: customer strategy 514a, selling and channel strategy 514b, sourcing and supply chain strategy 514c, and brand, product, and assortment strategy 514d. Operational plan 512b comprises level-two process markers: financial plan 514e, macrospace plan 514f, merchandise plan 514g, key item plan 514h, channel plan 514i, store operations plan 514j, range planning 514k, location clustering 514l, and supply chain plan 514m. According to some embodiments, lifecycle management 512c and customer engagement 512d comprise level-two process markers 514n-514r and 514s-514v, respectively, but specific examples are omitted for clarity.

Based on retail process methodology hierarchy 400, assessment module 238 of retail process manager 110 performs an assessment by assigning a maturity level to each competency for each level-two process markers 412a-412n. For example, assessment module 238 may assign one or more of innocence, understanding, competence, or excellence to each level-two process markers 412a-412n, according to a response to an inquiry.

In addition, the exemplary maturity levels comprise discrete identifiable maturity levels indicating one or more qualities possessed by supply chain entities 120 in regard to that specific aspect. In addition, or as an alternative, the standard maturity levels comprise a spectrum that indicates a relative maturity level indicating a maturity more or less than one or more standards.

According to some embodiments, retail process manager 110 assesses one or more process markers according to one or more competencies and/or KPIs. As an example only and not by way of limitation, retail process manager 110 generates an inquiry to supply chain entities 120 that comprises a request for a KPI or competency. According to a request for a KPI, retail process manager 110 assesses one or more KPIs and generates a maturity level using assessment module 238 of server 210 based on the value of the accessed KPI. According to a request for a competency, assessment module 238 generates one or more questions, and retail process manager 110 analyses the answers to those questions to determine the maturity level of supply chain entities 120 according to one or more process markers, such as, for example, level-two process markers 414a-414n.

According to some embodiments, the assessment comprises one or more questionnaires that are administered by one or more users, wherein the answers to the questionnaires are received by the retail process manager 110. As an example only and not by way of limitation, exemplary questionnaires related to each of the high-level, level-one, and level-two process markers are presented in TABLE 6.

TABLE 6

| Level | Description |
|---|---|
| Level-one | Amount of time and resources to achieve level-one process markers |
| | Is the level-one process marker a driving factor throughout the entire one or more supply chain entities 120 |
| | Does the end of a merchandise season end with too much inventory at one or more supply chain entities 120 |
| | Do customer preferences effect inventory of one or more supply chain entities 120 |
| | Effects of merchandising and controlling the brand on design and development of one or more supply chain entities 120 |
| | Effects of the material used in the production of products at one or more supply chain entities 120 |
| | Steps taken in sourcing for procurement of products at one or more supply chain entities 120 |
| | Effects of meeting quality assurance requirements at one or more supply chain entities |
| | What are the requirements for the management of the one or more supply chain entities 120 |
| Level-two | During the strategic planning process, how does the customer enter into consideration |
| | Define the process to achieve each level-two process marker |
| | How is your understanding of the customer manifested in subsequent planning and execution activity within the one or more supply chain entities 120 |
| | How are new channels within the one or more supply chain entities 120 integrated into the strategic plans |
| | What portion of the merchandise do you own the entire supply chain process |
| | How is the development of new products integrated into the Strategic Planning |
| | How would you define the key objectives of the merchandise plan within the one or more supply chain entities 120 |
| | How do you execute organizing the channels of distribution within the one or more supply chain entities 120 |

In one embodiment, retail process manager 110 comprises user interface 244 that populates questions from assessment module 238 related to one or more high-level process markers and receives the answer to the questions directly through user interface 244. In another embodiment, retail process manager 110 uses the answers to the questions to generate a score for supply chain entities 120 using scoring module 232. In one embodiment, scoring module 232 ranks answers to the questions using one or more statistical processes and weighting factors. In another embodiment, scoring module 232 uses the score directly to generate a maturity level, or compare the score to one or more maturity level standards to indicate the maturity level by a comparison with the standards. The battery assessment, answers to the questions, and score are stored in the database coupled with the retail process manager 110 as assessment data 260, maturity data 266, and score data 272, respectively. As discussed above, maturity data 266 is used by the retail process manager 110 to generate maturity map 900.

Figure 6:
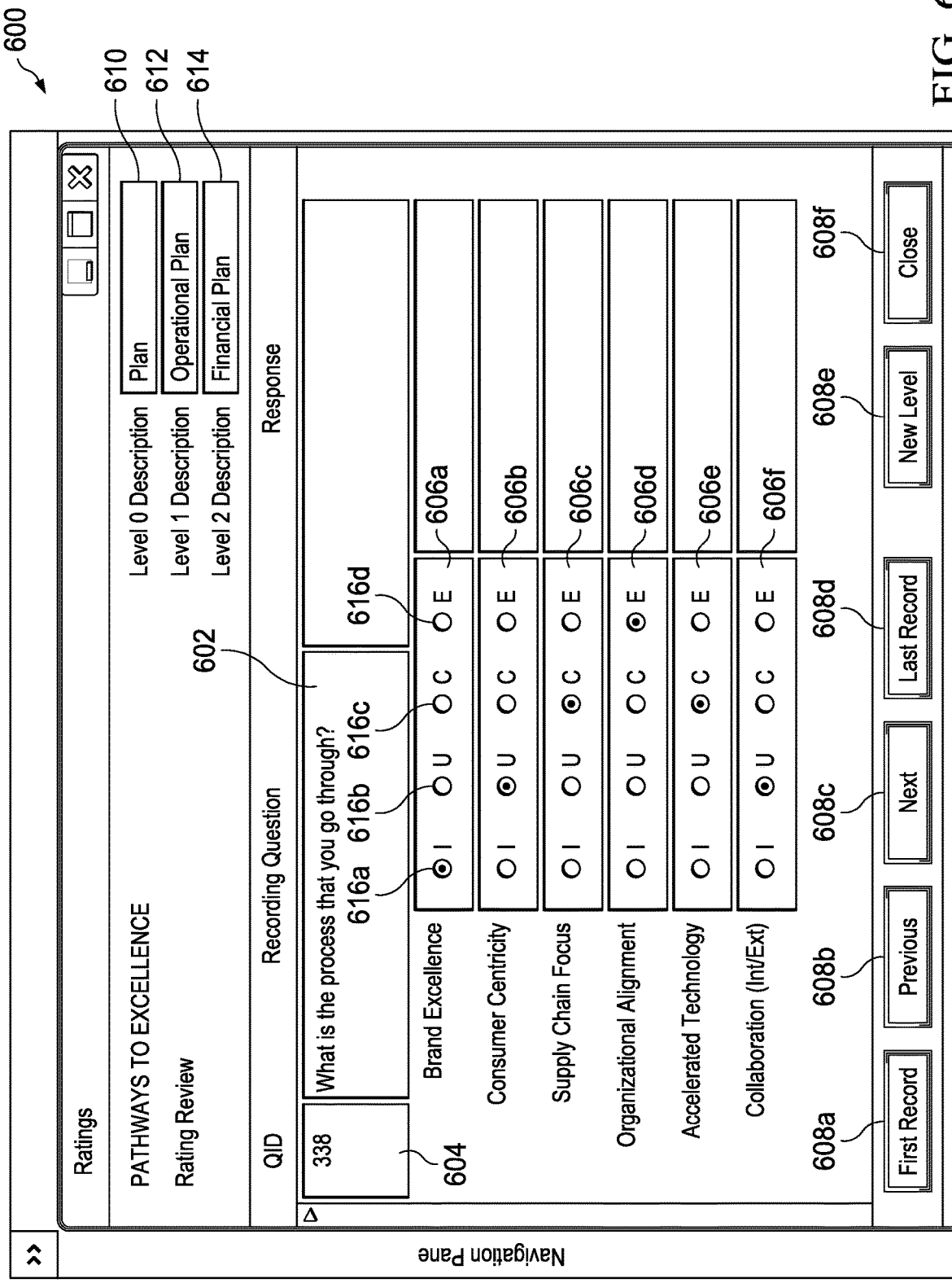
FIG. 6 illustrates an exemplary ratings assessment interface in accordance with an embodiment.

FIG. 6 illustrates several features of graphical user interface (GUI) 600 that may be present in one or more combinations, according to particular needs. In one embodiment, GUI 600 is generated by user interface 244 and comprises one or more assessment questions 602 (identified by a question identification 604), one or more maturity level selection boxes 606a-606f, navigation buttons 608a-608f, and process marker hierarchy identification boxes 610-614. The one or more assessment questions 602 comprise question identification 604 and the text of the assessment question 602. For example, in FIG. 6, the question identification number question identification is 338, and the text of the assessment question is "What is the process that you go through?"

In response to assessment question 602, retail process manager 110 identifies or receives input in one or more maturity level selection boxes 606a-606f according to one or more maturity level selections 616a-616d. According to some embodiments, maturity level selection boxes 606a-606f comprise a maturity spectrum box on which a maturity level regarding the assessment question 602 is indicated by retail process manager 110. FIG. 6 illustrates six exemplary competencies: brand excellence, consumer centricity, supply chain focus, organizational alignment, enabled technology, and collaboration (internal/external)) for which one of four maturity levels (innocent (I) 616a, understanding (U) 616b, competence (C) 616c, and excellence (E) 616d) may be indicated by retail process manager 110. Embodiments contemplate any number of maturity levels 616a-616d. In addition, or as an alternative, a maturity level slider that indicates on a spectrum a precise, relative, or approximate maturity level.

Process marker hierarchy identification boxes 610-614 identify the place in the hierarchy 400 to which assessment question 602 relates. According to some embodiments, hierarchy identification boxes 610-614 identify the level-zero process marker 410a-410n in a level-zero identification box 610, the level-one process marker 412a-412n in a level-one identification box 612, and the level-two process marker 414a-414n in a level-two identification box 614 most closely related to the assessment question 602 currently displayed. For example, assessment question 602 presented in FIG. 6 corresponds to plan 510a, operational plan 512b, and financial plan 514e.

Navigation buttons 608a-608f on GUI 600 enable a navigation between different questions 602 in hierarchy 400 and in and out of GUI 600 to one or more separate modules. In some embodiments, assessment question 602 may comprise one of approximately 2,500 separate questions, the answers to which identify maturity in each competency 606a-606f, as described in more detail below. According to some embodiments, after a determination according to each competency 606a-606f, scoring module 232 generates a score based on the selected maturity level 616a-616d.

Figure 7:
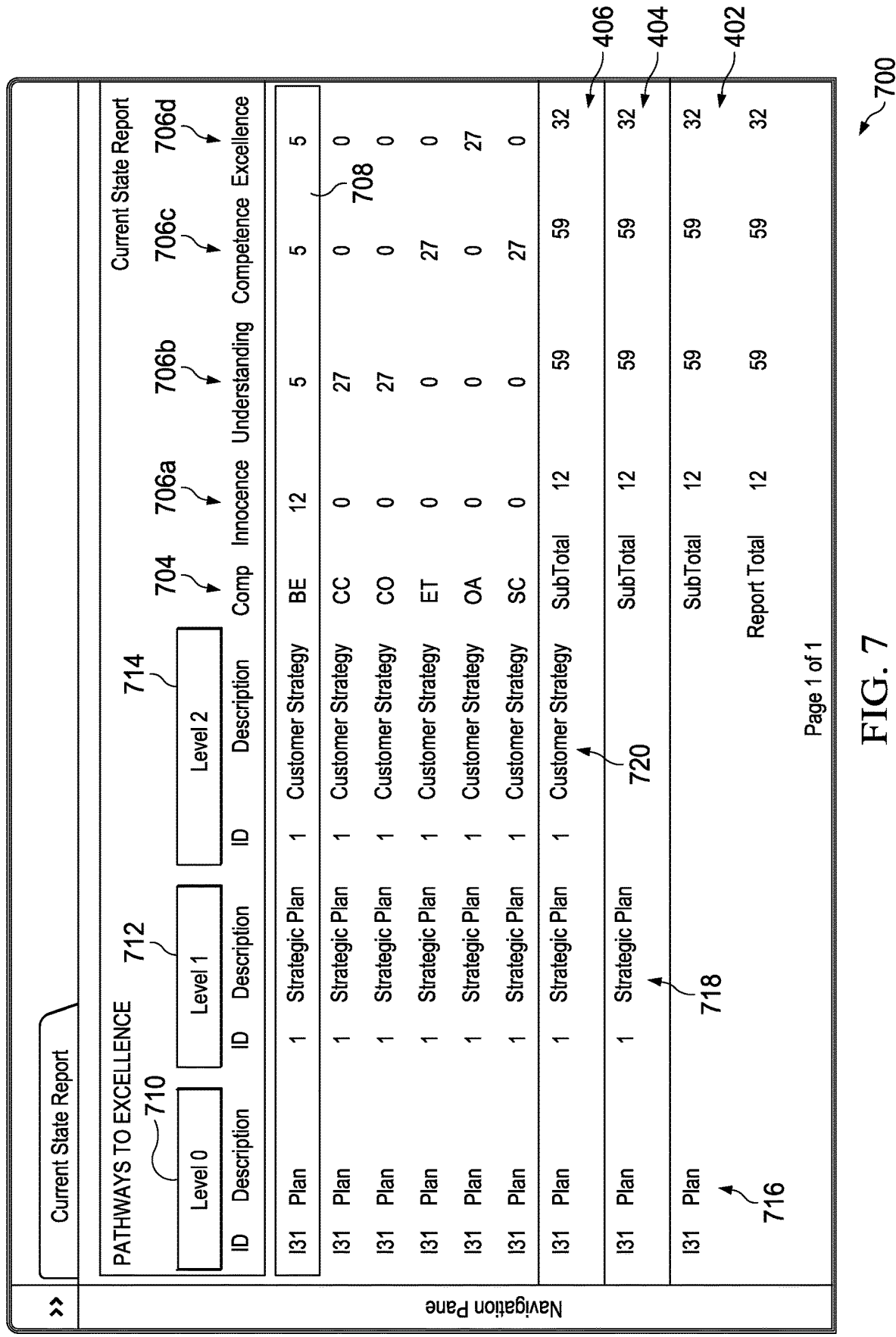
FIG. 7 illustrates an exemplary current state report interface in accordance with an embodiment.

FIG. 7 illustrates a current state report 700 generated by user interface 244 according to a received maturity level 616a-616d. According to some embodiments, current state report 700 comprises one or more competencies 704 sorted according to level-two process markers 414a-414n and score 708 associated with each competency 704 and maturity level 706a-706d. Level-two process markers 414a-414n may be sorted according to hierarchy 400 and each of the process markers may be identified by level descriptions 710-714 and ID's 716-720.

For example, for the level-two process markers 414a-414n customer strategy 514a, the current state report 700 identifies the level-zero process marker 410a-410n as plan 510a and the level-one process marker 412a-412n as strategic plan 512a. For customer strategy 514a, a score is shown for each of the six competencies 704 evaluated in FIG. 6 and categorized according to the maturity levels 706a-706d. As an example only and not by way of limitation, for the competency Brand Excellence (BE) the score for innocence is 12, the score for understanding is 5, the score for competence is 5, and the score for excellence is 5. Each of the other competencies 704 are associated with scores for each of the maturity levels 706a-706d, wherein CC represents consumer centricity, CO represents collaboration, ET represents enabled technology, OA represents organizational alignment, and SC represents supply chain focus. Although particular competencies are shown and described, embodiments contemplate any competency according to particular needs.

According to some embodiments, scores 708 associated with each competency 704 and maturity level 706a-706d are generated by aggregating the responses to each assessment question 602 from one or more inquiries. For example, according to some embodiments, assessment questions 602 are generated multiple times and evaluated against different areas of supply chain entities 120, such as for example, different employees, different working groups, different divisions, or the like. According to some embodiments, each level-two process marker 414a-414n is associated with multiple questions, and the response to the multiple questions associated with a single level-two process marker 414a-414n are aggregated into scores 708. According to the example, provided in FIG. 7, customer strategy 514a was evaluated 27 times, and each of the responses to the questions 602 relating to customer strategy 514a are recorded.

Next, each of the four maturity level scores 708 are totaled for the process markers of level-two 406, level-one 404, and level-zero 402. Although only a single level-two 406, level-one 404, and level-zero 402 process markers are shown and described, embodiments contemplate current state report 700 generates a subtotal across one or more or all of assessed process markers.

After scoring module 232 generates a score for the evaluated process markers, scoring module 232 generates a total score and percentage which may be used to generate a maturity level associated with each of level-zero 402, level-one 404, and level-two 406 of hierarchy 400.

FIG. 8 illustrates an exemplary rating report 800 generated by user interface 244. According to some embodiments, rating report 800 comprises a rating score 802, a maximum score 804, and percentage score 806 for one or more process markers at level-zero 402, level-one 404, and/or level-two 406. Rating score 802, maximum score 804, and percentage score 806 are generated by scoring module 232 according to one or more exemplary scoring methods described above. According to the illustrated example, rating score 802 comprises the sum of subtotals for each maturity level 706a-706d where the subtotal for understanding 706b is multiplied by two, the subtotal for competence 706c is multiplied by three, and the subtotal for excellence 706d is multiplied by four. For example, rating score 802 is calculated according to: 12+59*2+59*3+32*4=435. According to the same embodiment, maximum score 804 is calculated by determining the maximum total points possible for the evaluation, in this case, where all selected maturity levels for each competence was excellence. Therefore, maximum score 804 is calculated according to: 27*4*6=648. Percentage score 806 is then generated by dividing the rating score 802 by maximum score 804. According to the illustrated embodiment, percentage score 806 is calculated according to 435/648=67.1%.

According to embodiments, rating score 802, maximum score 804, and percentage score 806 are calculated for the process markers of level-two 406, level-one 404, and level-zero 402. Although only a single level-two 406, level-one 404, and level-zero 402 process markers are shown and described, embodiments contemplate rating report 800 to generate rating scores 802, maximum scores 804, and percentage scores 806, across one or more or all of assessed process markers.

According to some embodiments, one or more scores are assigned weights according to the level-two process marker with which they are associated. As an example only and not by way of limitation, operational plan 512b comprises several level-two process markers 514e-514m as described above. Scores which are generated based on these level-two process markers may be weighted according to the importance of the level-two process marker for an omni-channel retailer. For example, financial plan 514e is critical to an omni-channel retailer, so the score associated with financial plan 514e is accorded a higher weight, for example 25%, than according to other level-two process markers 514f-514m of operational plan 512b. Continuing with the example, macrospace plan 514 is less important so it will be accorded a lower weight, for example 5%, than financial plan 514e.

In addition, or as an alternative, after percentage score 806 or weighted score is calculated, mapping module 246 of retail process manager 110 generates a maturity map 900 according to one or more of the assessed process markers based, at least in part, on percentage score 806 or weighted score. According to an embodiment, a score of 0%-25% may be considered innocent, a score of 26%-55% may be considered understanding, a score of 56% to 85% may be considered competence, and a score greater than 85% may be considered excellent. Although a particular score is described as being associated with a maturity level, embodiments contemplate any score or range of scores being associated with a maturity level.

Figure 9:
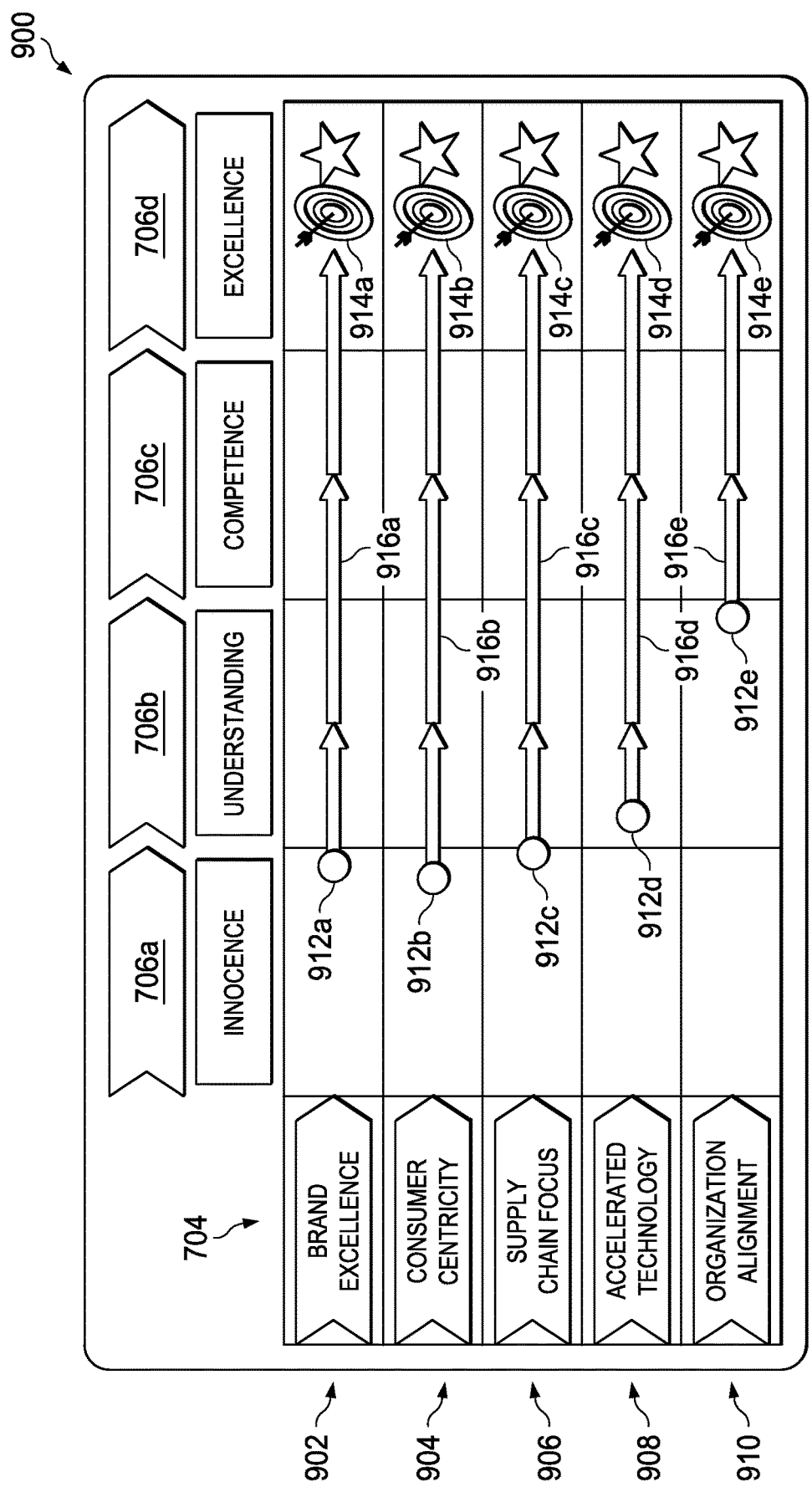
FIG. 9 illustrates an exemplary maturity map in accordance with an embodiment.

FIG. 9 illustrates an exemplary maturity map 900 generated by mapping module 246 of retail process manager 110. According to an embodiment, maturity map 900 comprises maturity levels 706a-706d charted for one or more competencies 704. According to some embodiments, charted competencies 704 comprise brand excellence 902, consumer centricity 904, supply chain focus 906, accelerated technology 908, and/or organization alignment 910. Each charted competency 902-910 comprises an initial maturity level 912a-912e and a final maturity level 914a-914e. An initial maturity level 912a-912e may comprise the maturity level determined according to the percentage score 806. The final maturity level 914a-914e may comprise a preselected maturity level received from supply chain entities 120 or may comprise a highest-rated maturity, for example, a maturity of excellence 706d. The difference between an initial maturity level 912a-912e and a final maturity level 914a-914e is termed a maturity gap 916a-916e. The maturity gap 916a-916e comprises the distance that supply chain entities 120 must cover to transition to an omni-channel retailer for the associated competency 704.

Although maturity map 900 is illustrated as comprising one or more competencies 704 charted for one or more maturity levels 706a-706d, embodiment contemplate maturity map 900 comprising one or more assessed process markers, such as level-zero 402, level-one 404, and level-two 406 process markers charted for one or more maturity levels 706a-706d and/or competencies 704, according to particular needs.

After a maturity gap 916a-916e is determined, charting module 236 identifies transition projects 1002a-1002q, which, when performed by supply chain entities 120 transitions supply chain entities 120 to an omni-channel retailer, according to one or more competencies 704.

Figure 10:
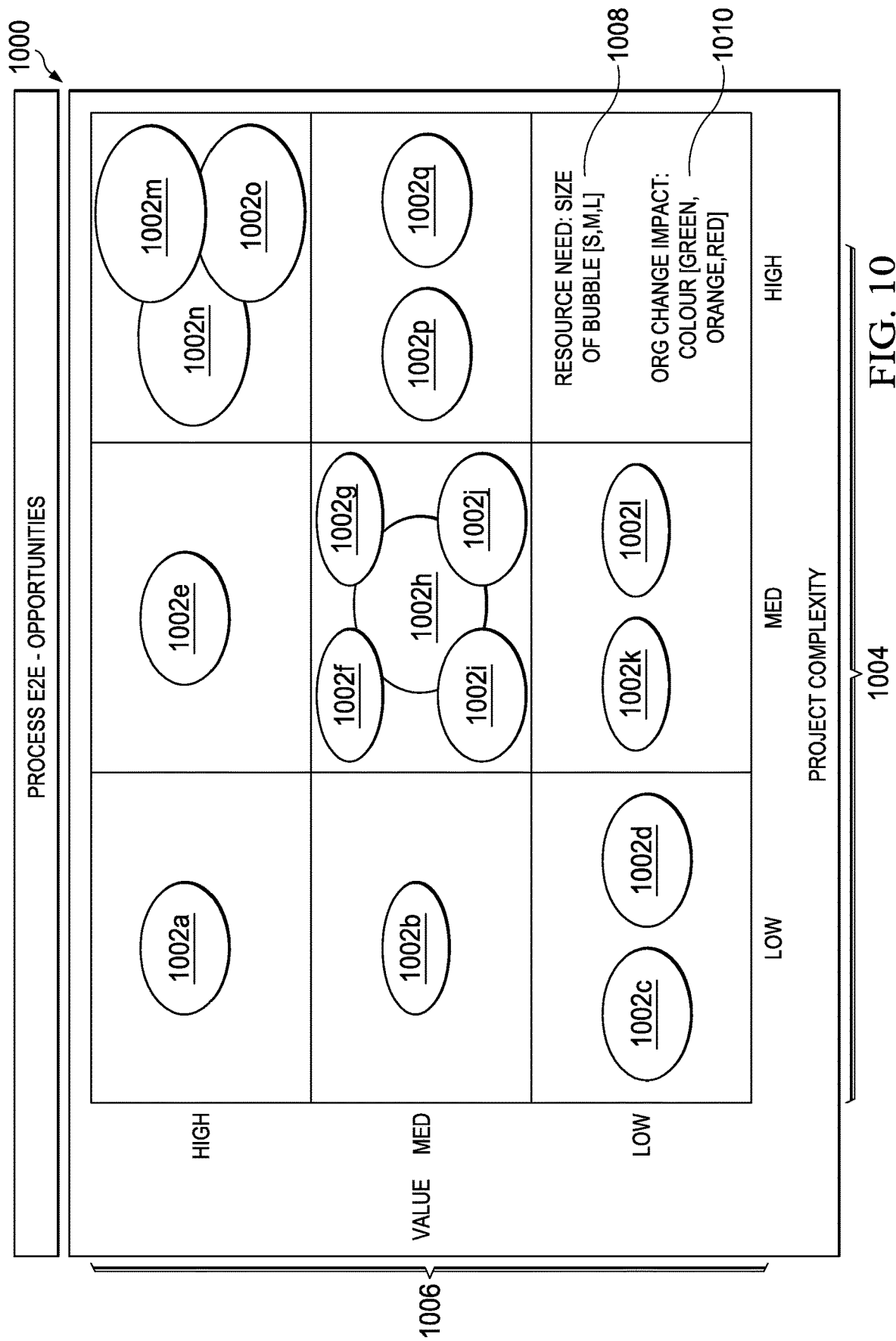
FIG. 10 illustrates an exemplary bubble chart according to transition projects in accordance with an embodiment.

FIG. 10 illustrates an exemplary bubble chart 1000 that presents a listing of potential transition projects 1002a-1002q based, at least in part, on maturity gaps 916a-916e in maturity map 900. Transition projects 1002a-1002q may be rated or scored according to one or more metrics such as return on investment, project complexity, value, initial cost, amount of organizational rearrangement, number of resources utilized, amount of time to complete the project, and the like. According to one embodiment, transition projects 1002a-1002q are rated by one or more of complexity 1004, value 1006, resource need 1008, and/or organizational change impact 1010. According to some embodiments, complexity 1004 is represented by the x-axis and comprises, for example, the time to complete the transition projects 1002a-1002q, the number of different client teams needed to complete the transition projects 1002a-1002q and the amount of resources needed to complete the transition projects 1002a-1002q.

According to other embodiments, value 1006 is represented by the y-axis and comprises a return on investment, including for example, an improvement in the competency, and the ability to meet the key performance indicators better, faster, and/or more efficiently, for the transition projects 1002a-1002q. In addition, or as an alternative, resource need 1008 is represented by the size of the bubbles in bubble chart 1000 and represents the amount of resources, numerical commitment and the percentage of commitment. In addition, organization change impact 1010 is represented by the color of the bubbles in bubble chart 1000 and represents the amount of change of different roles in the organization (i.e., creation of new roles or the elimination/revision of existing roles) and relates to one or more change management high-level assessment plans.

According to an embodiment, transition project 1002a corresponds to a transition project 1002a with a low project complexity, a high value 1006, a medium amount of resource need 1008, and a high organization impact 1010. Therefore, 1002a is likely to be selected as a potential transition project to overcome one or more maturity gaps 916a-916e. As another example, project 1002q is unlikely to be selected as a potential transition project to overcome one or more maturity gaps 916a-916e because it has a high project complexity 1004, a medium value 1006, medium resource need 1008, and a low organization change impact 1010. Although according to the examples, 1002a is likely to be selected and 1002q is unlikely to be selected as a transition project 1002a-1002q to overcome a maturity gap 916a-916e, each transition project 1002a-1002q may be chosen based on various parameters according to particular needs.

Furthermore, in one embodiment, one or more transition projects 1002a-1002q must be implement before another transition project 1002a-1002q is implemented. For example, a financial plan would be required to be implemented prior to the start of a performance dashboard, such that, the financial plan can be measured in the dashboard.

According to other embodiments, bubble chart 1000 indicates a relationship between transition projects 1002a-1002q to indicate a dependent or other relationship indicating that one transition project 1002a-1002q must be selected or completed to perform another transition project 1002a-1002q. In addition, or as an alternative, after transition projects 1002a-1002q are identified that correspond to maturity gaps 916a-916e, mapping module 246 of retail process manager 110 generates roadmap 1100 and stores the roadmap 1100 in roadmap data 270, as discussed in more detail below.

Figure 11:
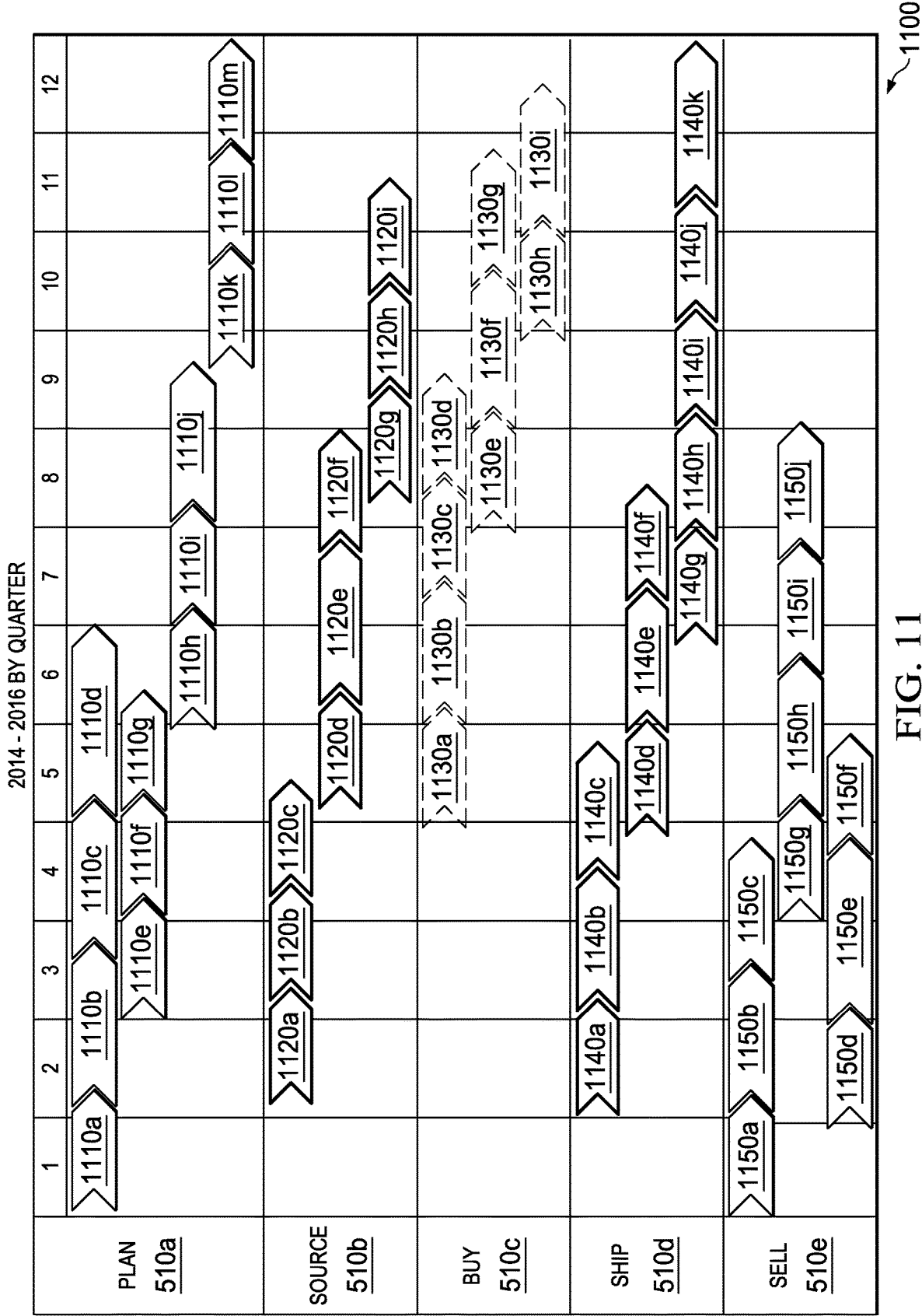
FIG. 11 illustrates an exemplary high-level roadmap in accordance with an embodiment.

FIG. 11 illustrates an exemplary high-level roadmap 1100 generated by mapping module 246. According to some embodiments, high-level roadmap 1100 comprises transition activities 1110a-1110m, 1120a-1120i, 1130a-1130i, 1140a-1140k, and 1150a-1150j scheduled according to one or more time periods 1102, such as, for example, monthly, quarterly, and/or annually. In addition, transition activities 1110a-1110m, 1120a-1120i, 1130a-1130i, 1140a-1140k, and 1150a-1150j comprise a transition project 1020a-1020q or a portion of a transition project 1020a-1020q. For example, one or more transition project 1020a-1020q identified by charting module 236 may comprise one or more transition activities 1110a-1110m, 1120a-1120i, 1130a-1130i, 1140a-1140k, and 1150a-1150j that when performed in one or more permutations close a maturity gap 916a-916e identified in maturity map 900.

According to an embodiment, mapping module 246 of retail process manager 110 determines a cost and return on investment associated with one or more potential transition projects 1020a-1020q and determines a capital outlay for supply chain entities 120. Retail process manager 110 generates or receives capital outlay data 276 and generates growth charts, for example by using charting module 236 of server 110. Capital outlay data 276 may be stored in database 220 and growth charts may identify or illustrate outlays of capital to support corporate planning.

Based on this determination, mapping module 246 communicates with scheduler 240 to generate roadmap 1100 of potential transition activities 1110a-1110m, 1120a-1120i, 1130a-1130i, 1140a-1140k, and 1150a-1150j that may be performed according to a timeline based on cost, return on investment, and capital outlays. For example, one or more projects may have a cost higher than the expected capital outlay for a first quarter. According to this example, planner 242 would move the project to a later quarter when the capital outlay was high enough to permit supply chain entities 120 to perform the project. According to some embodiments, transition activities 1110a-1110m, 1120a-

1120*i*, 1130*a*-1130*i*, 1140*a*-1140*k*, and 1150*a*-1150*j* with a high return on investment and a low cost may be moved to an earlier time period 1102 in the roadmap 1100 in order to generate higher revenue for the one or more supply chain entities 120.

According to some embodiments, roadmap 1100 comprises an arrow that represents each transition activity 1110*a*-1110*m*, 1120*a*-1120*i*, 1130*a*-1130*i*, 1140*a*-1140*k*, and 1150*a*-1150*j* wherein the length of the arrow indicates a time period over which the transition activity 1110*a*-1110*m*, 1120*a*-1120*i*, 1130*a*-1130*i*, 1140*a*-1140*k*, and 1150*a*-1150*j* is performed by supply chain entities 120. For example, the beginning of an arrow may indicate the starting time of the transition activity 1110*a*-1110*m*, 1120*a*-1120*i*, 1130*a*-1130*i*, 1140*a*-1140*k*, and 1150*a*-1150*j* and the end of the arrow may indicate the ending time of the transition activity 1110*a*-1110*m*, 1120*a*-1120*i*, 1130*a*-1130*i*, 1140*a*-1140*k*, and 1150*a*-1150*j*. According to some embodiments, transition activities 1110*a*-1110*m*, 1120*a*-1120*i*, 1130*a*-1130*i*, 1140*a*-1140*k*, and 1150*a*-1150*j* are grouped according to complementary transition processes 1020*a*-1020*q* that feed from one into another, such that there may be overlapping transition processes 1020*a*-1020*q* in the same category that may need to be performed simultaneously. Embodiments contemplate transition activities 1110*a*-1110*m*, 1120*a*-1120*i*, 1130*a*-1130*i*, 1140*a*-1140*k*, and 1150*a*-1150*j* that may be categorized into more than one category or antecedent activities 1110*a*-1110*m*, 1120*a*-1120*i*, 1130*a*-1130*i*, 1140*a*-1140*k*, and 1150*a*-1150*j* that need to be performed in one category so that a process in a separate category can be performed afterward. Furthermore, the roadmap may identify start and stop dates of key initiatives and projects. The roadmap 1100 preferably identifies a duration, such as, for example, three to five years, depending on the complexity of the transformation or the size of the maturity gap. Furthermore, the roadmap may depict key initiatives and/or projects categorized by retail process methodology process markers, by competencies, or by impact to people, process, solutions, and/or technology.

According to some embodiments, one or more transition projects 1020*a*-1020*q* comprise one or more transition activities 1110*a*-1110*m*, 1120*a*-1120*i*, 1130*a*-1130*i*, 1140*a*-1140*k*, and 1150*a*-1150*j* that are the same for the one or more transition projects 1020*a*-1020*q*. According to these embodiments, transition activities 1110*a*-1110*m*, 1120*a*-1120*i*, 1130*a*-1130*i*, 1140*a*-1140*k*, and 1150*a*-1150*j* may be scheduled on roadmap so that transition activities 1110*a*-1110*m*, 1120*a*-1120*i*, 1130*a*-1130*i*, 1140*a*-1140*k*, and 1150*a*-1150*j* that more than one transition projects 1020*a*-1020*q* have in common are scheduled at an earlier time period 1102.

Figure 12:
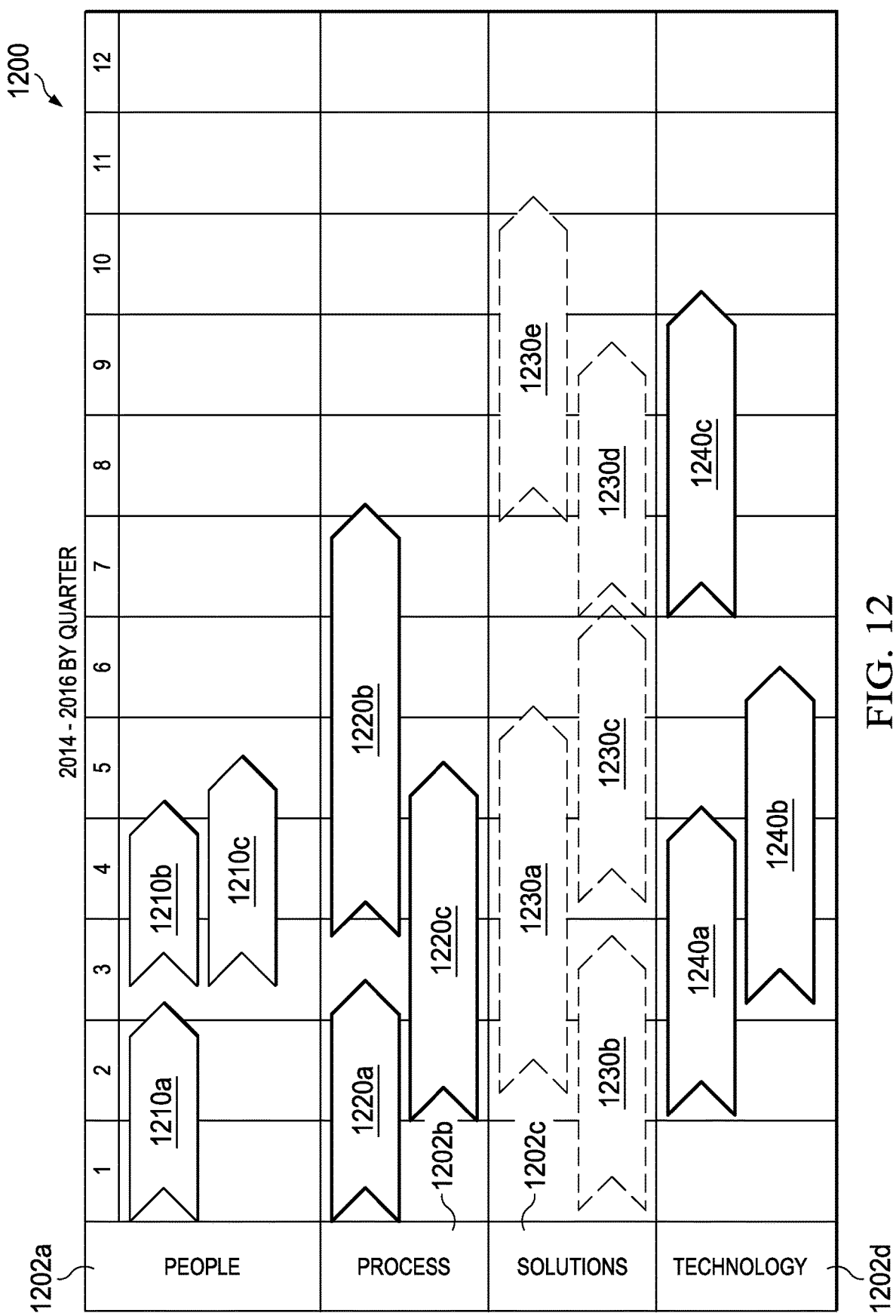
FIG. 12 illustrates an exemplary people, process, solutions, technology roadmap in accordance with an embodiment.

FIG. 12 illustrates a second exemplary roadmap 1200 which categorizes one or more second transition activities 1210*a*-1210*c*, 1220*a*-1220*c*, 1230*a*-1230*e*, and 1240*a*-1240*c*, according to people 1202*a*, process 1202*b*, solutions 1202*c*, and technology 1202*d*. Although not shown, embodiments contemplate a roadmap 1200 that identifies which transition activities transition activities 1210*a*-1210*c*, 1220*a*-1220*c*, 1230*a*-1230*e*, and 1240*a*-1240*c* must be performed prior to subsequent transition activities 1210*a*-1210*c*, 1220*a*-1220*c*, 1230*a*-1230*e*, and 1240*a*-1240*c* and generates a roadmap 1200 where antecedent transition activities 1210*a*-1210*c*, 1220*a*-1220*c*, 1230*a*-1230*e*, and 1240*a*-1240*c* are placed at an earlier time period than later transition activities 1210*a*-1210*c*, 1220*a*-1220*c*, 1230*a*-1230*e*, and 1240*a*-1240*c*. In addition, roadmap 1200 may indicate a ranking of transition activities 1210*a*-1210*c*, 1220*a*-1220*c*, 1230*a*-1230*e*, and 1240*a*-1240*c*, each of which may eliminate a maturity gap 916*a*-916*e* or a portion of a maturity gap 916*a*-916*e*, and/or ranked according to, for example, return on investment, capital outlay, time involved, complexity, or the like.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
   a supply chain network comprising one or more retailers comprising an inventory of one or more products at one or more locations;
   a computer comprising a memory and a processor, the computer configured to:
   identify one or more competencies of the one or more retailers in the supply chain network;
   determine an initial maturity level for the one or more retailers according to one or more level-one process markers and receive a final maturity level for the one or more level-one process markers;
   determine one or more maturity gaps associated with the one or more competencies of the one or more retailers and according to the difference between the initial maturity level and the final maturity level;
   identify one or more transition projects that fill the one or more determined maturity gaps by mapping the one or more transition projects on a computer display using a bubble chart, wherein the bubble chart is mapped according to a value versus complexity with bubbles in the bubble chart sized according to resource needs corresponding to the one or more transition projects;
   roadmap one or more transition activities that generate the one or more identified transition projects that fill the one or more determined maturity gaps; and
   adjust the inventory of the one or more products of the one or more retailers based on the one or more roadmapped transition activities.

2. The system of claim 1, wherein the computer is further configured to:
   generate a retail process methodology hierarchy comprising one or more high-level process markers, the one or more level-one process markers, and one or more level-two process markers; and
   assess the one or more retailers according to the one or more level-two process markers according to the one or more competencies.

3. The system of claim 2, wherein the computer is further configured to:
   generate a score for the one or more level-two process markers according to one or more maturity levels.

4. The system of claim 3, wherein the computer is further configured to:
   calculate a return on investment and a cost for each of the one or more identified transition projects;

determine an estimate of capital outlays for the one or more retailers; and roadmap one or more transition activities based, at least in part, on the calculated return on investment and cost and determined estimate of capital outlays.

5. The system of claim 4, wherein the computer is further configured to:

sort the one or more transition projects according to one or more of project complexity, project value, resource need, and organizational change impact.

6. The system of claim 5, wherein the maturity levels are chosen from one or more of innocence, understanding, competence, and excellence.

7. A computer-implemented method, comprising:

identifying, by a computer comprising a memory and a processor, one or more competencies of one or more retailers comprising an inventory of one or more products at one or more locations in a supply chain network;

determining, by the computer, an initial maturity level for the one or more retailers according to one or more level-one process markers and receiving, by the computer, a final maturity level for the one or more level-one process markers;

determining, by the computer, one or more maturity gaps associated with the one or more competencies of the one or more retailers and according to the difference between the initial maturity level and the final maturity level;

identifying, by the computer, one or more transition projects that fill the one or more determined maturity gaps by mapping the one or more transition projects on a computer display using a bubble chart, wherein the bubble chart is mapped according to a value versus complexity with bubbles in the bubble chart sized according to resource needs corresponding to the one or more transition projects;

roadmapping, by the computer, one or more transition activities that generate the one or more identified transition projects that fill the one or more determined maturity gaps; and adjusting, by the computer, the inventory of the one or more products of the one or more retailers based on the one or more roadmapped transition activities.

8. The computer-implemented method of claim 7, further comprising:

generating, by the computer, a retail process methodology hierarchy comprising one or more high-level process markers; the one or more level-one process markers, and one or more level-two process markers; and assessing, by the computer, the one or more retailers according to the one or more level-two process markers according to the one or more competencies.

9. The computer-implemented method of claim 8, further comprising:

generating, by the computer, a score for the one or more level-two process markers according to one or more maturity levels.

10. The computer-implemented method of claim 9, further comprising:

calculating, by the computer, a return on investment and a cost for each of the one or more identified transition projects;

determining, by the computer, an estimate of capital outlays for the one or more retailers; and roadmapping, by the computer, one or more transition activities based, at least in part, on the calculated return on investment and cost and determined estimate of capital outlays.

11. The computer-implemented method of claim 10, further comprising:

sorting, by the computer, the one or more transition projects according to one or more of project complexity, project value, resource need, and organizational change impact.

12. The computer-implemented method of claim 5, wherein the maturity levels are chosen from one or more of innocence, understanding, competence, and excellence.

13. A non-transitory computer-readable medium embodied with software, the software when executed using one or more computers is configured to:

identify one or more competencies of one or more retailers comprising an inventory of one or more products at one or more locations in a supply chain network;

determine an initial maturity level for the one or more retailers according to one or more level-one process markers and receive a final maturity level for the one or more level-one process markers;

determine one or more maturity gaps associated with the one or more competencies of the one or more retailers and according to the difference between the initial maturity level and the final maturity level;

identify one or more transition projects that fill the one or more determined maturity gaps by mapping the one or more transition projects on a computer display using a bubble chart, wherein the bubble chart is mapped according to a value versus complexity with bubbles in the bubble chart sized according to resource needs corresponding to the one or more transition projects;

roadmap one or more transition activities that generate the one or more identified transition projects that fill the one or more determined maturity gaps; and adjust the inventory of the one or more products of the one or more retailers based on the one or more roadmapped transition activities.

14. The non-transitory computer-readable medium of claim 13, the software further configured to:

generate a retail process methodology hierarchy comprising one or more high-level process markers; the one or more level-one process markers, and one or more level-two process markers; and assess the one or more retailers according to the one or more level-two process markers according to the one or more competencies.

15. The non-transitory computer-readable medium of claim 14, the software further configured to:

generate a score for the one or more level-two process markers according to one or more maturity levels.

16. The non-transitory computer-readable medium of claim 15, the software further configured to:

calculate a return on investment and a cost for each of the one or more identified transition projects;

determine an estimate of capital outlays for the one or more retailers; and roadmap one or more transition activities based, at least in part, on the calculated return on investment and cost and determined estimate of capital outlays.

17. The non-transitory computer-readable medium of claim 16, the software further configured to:

sort the one or more transition projects according to one or more of project complexity, project value, resource need, and organizational change impact.

\* \* \* \* \*